United States Patent
Montemer et al.

(10) Patent No.: US 7,200,413 B2
(45) Date of Patent: Apr. 3, 2007

(54) METHODS AND SYSTEM FOR ENHANCED DIRECTORY ASSISTANCE USING WIRELESS MESSAGING PROTOCOLS

(75) Inventors: William A Montemer, Laguna Hills, CA (US); Heath B. Clarke, Corona del Mar, CA (US)

(73) Assignee: Interchange Corporation, Irvine, CA (US)

( * ) Notice: Subject to any disclaimer, the term of this patent is extended or adjusted under 35 U.S.C. 154(b) by 300 days.

(21) Appl. No.: 10/630,247

(22) Filed: Jul. 30, 2003

(65) Prior Publication Data

US 2004/0023644 A1 Feb. 5, 2004

Related U.S. Application Data

(60) Provisional application No. 60/400,188, filed on Jul. 31, 2002.

(51) Int. Cl.
*H04Q 7/20* (2006.01)
*H04Q 7/38* (2006.01)

(52) U.S. Cl. ............... 455/466; 455/414.1; 455/414.2; 455/414.3; 455/456.1; 455/456.3; 455/422.1; 455/412.1; 705/8; 705/14; 707/3; 707/4; 707/6; 707/9; 707/10; 379/157; 379/214.01; 379/201.01; 709/203; 709/218; 709/219; 709/228

(58) Field of Classification Search ............... 455/403, 455/414.1, 414.2, 414.3, 414.4, 422.1, 426.1, 455/426.2, 456.1, 456.2, 456.3, 500, 517, 455/550.1, 445, 412.1, 412.2, 552.1; 705/8, 705/14; 707/3, 4, 6, 9, 10; 379/157, 214.01, 379/201.01; 709/203, 219, 218, 228
See application file for complete search history.

(56) References Cited

U.S. PATENT DOCUMENTS

| | | | |
|---|---|---|---|
| 6,078,866 A | 6/2000 | Buck et al. | |
| 6,269,361 B1 | 7/2001 | Davis et al. | |
| 6,446,043 B1* | 9/2002 | Matsumoto et al. | 705/8 |
| 6,519,616 B1 | 2/2003 | Zamora-McKelvy et al. | |
| 2002/0087408 A1* | 7/2002 | Burnett | 705/14 |
| 2003/0223565 A1 | 12/2003 | Montemer | |
| 2003/0225682 A1 | 12/2003 | Montemer | |
| 2004/0006511 A1 | 1/2004 | Montemer | |
| 2004/0010518 A1 | 1/2004 | Montemer | |
| 2004/0030689 A1* | 2/2004 | Anderson et al. | 707/3 |

\* cited by examiner

*Primary Examiner*—Keith Ferguson
(74) *Attorney, Agent, or Firm*—Van Pelt, Yi & James LLP (57) ABSTRACT

Directory assistance provides telephone number look up services to callers based on the business or caller name as listed in a telephone directory. In the prior art, directory assistance provides a value-added service to telephone users and an expense that must be charged back to telephone callers or absorbed by telephone carriers. In enhanced directory assistance (EDA) services as described in the disclosure, EDA is further developed to deliver a keyword targeted advertising service to telephone listing owners and advertisers. The present invention provides a method and system to extend EDA services to the wireless messaging systems used by telecommunications operators. The invention further discloses methods to support both one-way and two-way communications on these devices, as well as systems to support the distributed EDA Transaction business model.

1 Claim, 10 Drawing Sheets

Messaging Systems and EDA Listing Service

FIG. 1 - Distributed Enhanced Directory Assistance Listing Service

FIG. 2 – Messaging Systems and EDA Listing Service

FIG. 4 - Voice Enabled with Mobile Terminated Messaging

FIG. 5 – Voice Enabled with Mobile Originated Messaging

FIG. 6 - Message System Differences

| | Technology | Content | Access Method | Availability |
|---|---|---|---|---|
| WAP | Wireless Application Protocol | Active programmable stacks | Push/Pull | Limited System Specific Deployment |
| SMS | Short Message Service | Short Text Messages | Mobile Terminated Mobile Originated | Widely deployed |
| EMS | Enhanced Message Service | Longer Text Messages | Similar to SMS | Early deployment only |
| MMS | Multimedia Message Service | Rich Content types | Similar to SMS | Early deployment only |

FIG. 7 - Voice Originated EDA Single SMS Message Option

FIG. 8 - Voice Originated EDA SMS Menu Option

FIG. 9 - Session ID and Transaction Correlation Model

FIG. 10 - Core Messaging EDA Functional Blocks

METHODS AND SYSTEM FOR ENHANCED DIRECTORY ASSISTANCE USING WIRELESS MESSAGING PROTOCOLS

RELATED APPLICATION INFORMATION

This application claims priority from U.S. Provisional Patent Application No. 60/400,188 filed Jul. 31, 2002 and which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention generally relates to the field of telecommunications, and particularly relates to a system and method for providing advertising opportunities using directory assistance and wireless messaging systems.

2. Description of the Related Art

Telephone Directory Assistance has been around as long as there have been telephone operators. Once the number of telephone subscribers reached two and three digits, telephone directories were published as service to the large numbers of telephone subscribers. These published telephone directories or books helped both the subscribers and telephone operators locate and contact other telephone subscribers.

There are two types of telephone directories. The White Page-styled directory lists basic telephone contact information for all telephone subscribers; basic listings are free to all subscribers and subscribers are listed by name. The Yellow Page-styled directory lists products and services by category, to be included in a Yellow Page directory an advertiser must pay a fee. The Yellow Page directory advertiser pays for both the size of the advertisement or listing and for its inclusion in one or more specific categories.

Traditional directory assistance service provides telephone number look up to the White Page style directory. Enhanced directory assistance service provides look up to a Yellow Page style directory. The difference between the two is based on how a caller finds a particular directory listing.

In a traditional directory assistance service, the caller contacts a directory assistance operator and gives the operator the name of a business or person and its associated locale. The directory assistance operator then searches a telephone directory database for a telephone listing that matches the sought-after criteria. Upon finding a match or a set of matches, the operator informs the caller and either gets further information to narrow the results or offers to connect the caller to a desired telephone number.

In an enhanced directory assistance system, a caller contacts a directory assistance operator and in addition to providing as some localization information to narrow where the caller wishes to find the product or services, the caller provides a category name or keyword associated with the desired product or service. In the present art, an enhanced directory assistance operator then takes the provided information and searches or queries a Yellow Page-styled directory. Upon finding a match, the operator informs the caller and either gets further information to narrow the results or offers to connect the caller to the desired telephone number.

In the present art, inclusion in these paid listings is offered to a business or organization through monthly or yearly subscription fees. Also in the present art, listing partners can pay a premium fee to be listed at the top of a category or keyword lookup result list. The premium or preferred listing is given priority treatment by the directory assistance operator and mentioned before any other paid listings are communicated.

The present invention provides methods and systems that allow directory assistance providers to use shared directory assistance resources with already deployed wireless communications systems. The new revenue opportunities will allow significant revenue increases without requiring telecommunications companies to implement new infrastructures.

DETAILED DESCRIPTION OF THE INVENTION

Distributed Enhanced Directory Assistance Listing Service

Enhanced Directory Assistance (EDA) services provide opportunities for telephone listing owners and advertisers to promote products and services to telephone callers looking for the same products and services. In reference to FIG. 1, the illustration shows such an EDA Listing Service. In this embodiment, an EDA Advertiser 10 owns a set of telephone directory listings that are maintained in a Local Advertiser Directory Listing (LADL) Database 16 that is operated by the EDA Center 12. Each directory listing in the LADL is associated with one or more keywords.

Figure 1:
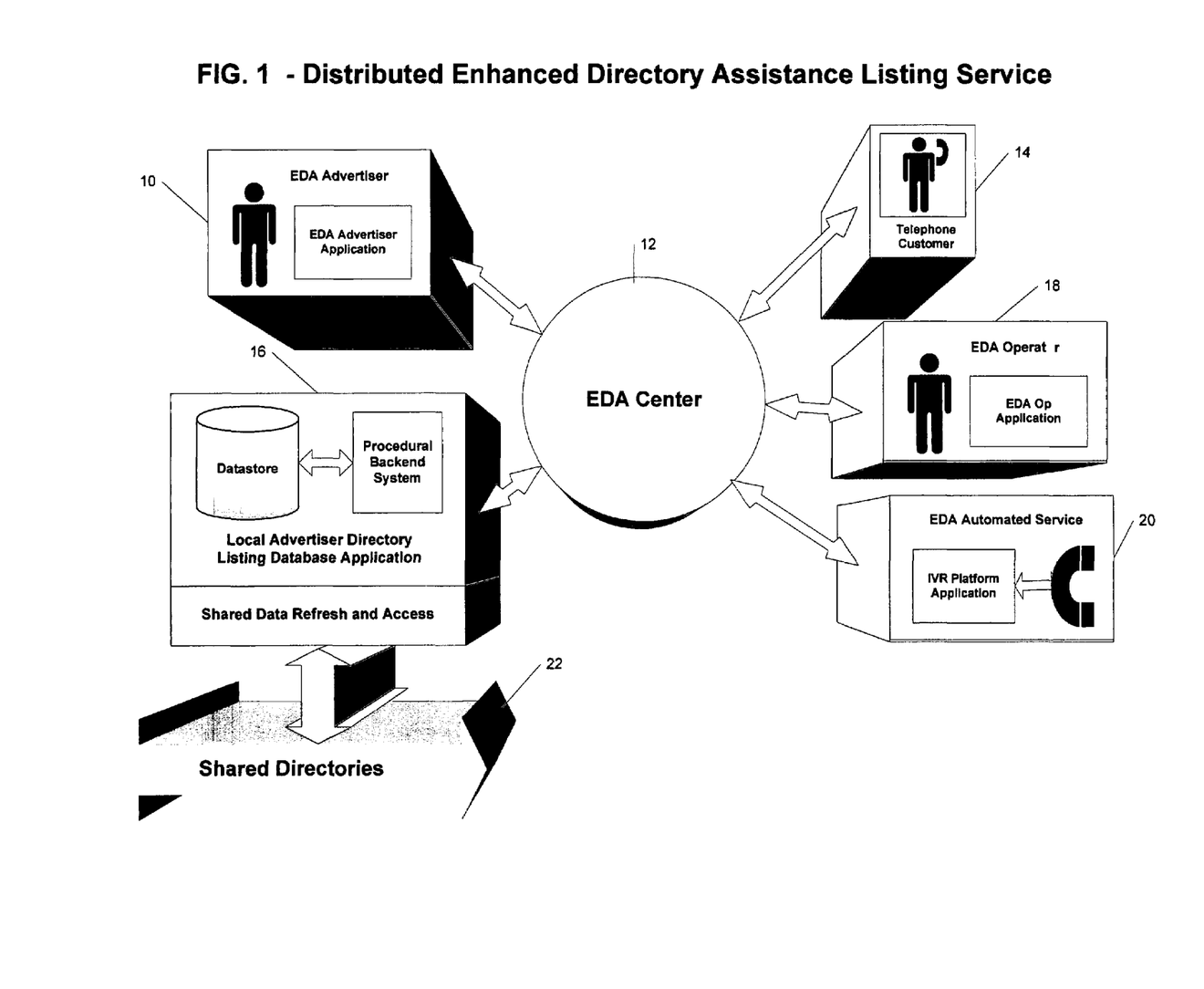
FIG. 1 shows a system block diagram of a distributed Enhanced Directory Assistance (EDA) Listing Service.

The operation of the EDA Listing Service is straightforward. The EDA Advertiser agrees to pay the EDA provider a predetermined amount of money for every telephone referral the advertiser receives from the EDA Center. The EDA service discussed here can rightly be called a paid referral service. The listings themselves may be organized by location, referral amount paid, and keyword association.

The LADL database contains directory listings that belong to advertising clients of that particular EDA Center. These listings are locally maintained and controlled.

At predetermined times, these local listings are published into a system of Shared Directories 22. The Shared Directories effectively comprise a "read-only" database of listings that are cached and distributed independently of the LADL data.

Once published as Shared Directories, the listings are aggregated and sorted with listings from other EDA Centers. This architecture enhances scalability and performance by keeping two sets of data. One set is "live" and available for maintenance and update. The other set is "read-only" and represents replicated data that is distributed throughout the network. The two sets of data are kept in sync by defining refresh rules and a data recycling architecture.

Each of the shared directory listings contains content information (Listing ID, Listing Description, Referral Phone Number), owner information (Advertiser ID, EDA Provider ID), business transaction information (Referral Amount, Business Rule ID), and keyword identifiers.

EDA Center Operation

In reference to FIG. 1, when a Telephone Customer 14 dials a predetermined EDA number, the EDA Center assigns the call to an EDA Operator 18. After determining the geographical location of the customer, the operator obtains a keyword from the customer, thereby identifying the product or service the customer is seeking.

The operator submits the keyword to the LADL database application, which queries the shared directory system. The system returns a list of advertised telephone listings and descriptions for the submitted keyword. The individual referrals can be organized in any number of ways. In one embodiment, the referral list is organized by the highest to lowest amount paid for each referral. In this embodiment the EDA operator recites the list to the customer, who selects one of the referral items.

In another EDA Listing Service embodiment, the functions of the EDA Operator can be done by an Interactive Voice Response (IVR) system 20. In an IVR embodiment a series of voice dialogs could be constructed using any number of well-known Voice XML (VXML) platforms. As before, the IVR system presents the customer with a set of referrals and the customer selects one.

The final result of an EDA inquiry is a telephone referral. In the referral, the inquiry call is transferred to the selected advertised directory listing referral number and a referral business transaction is initiated.

Messaging Systems and EDA Listing Service

Figure 2:
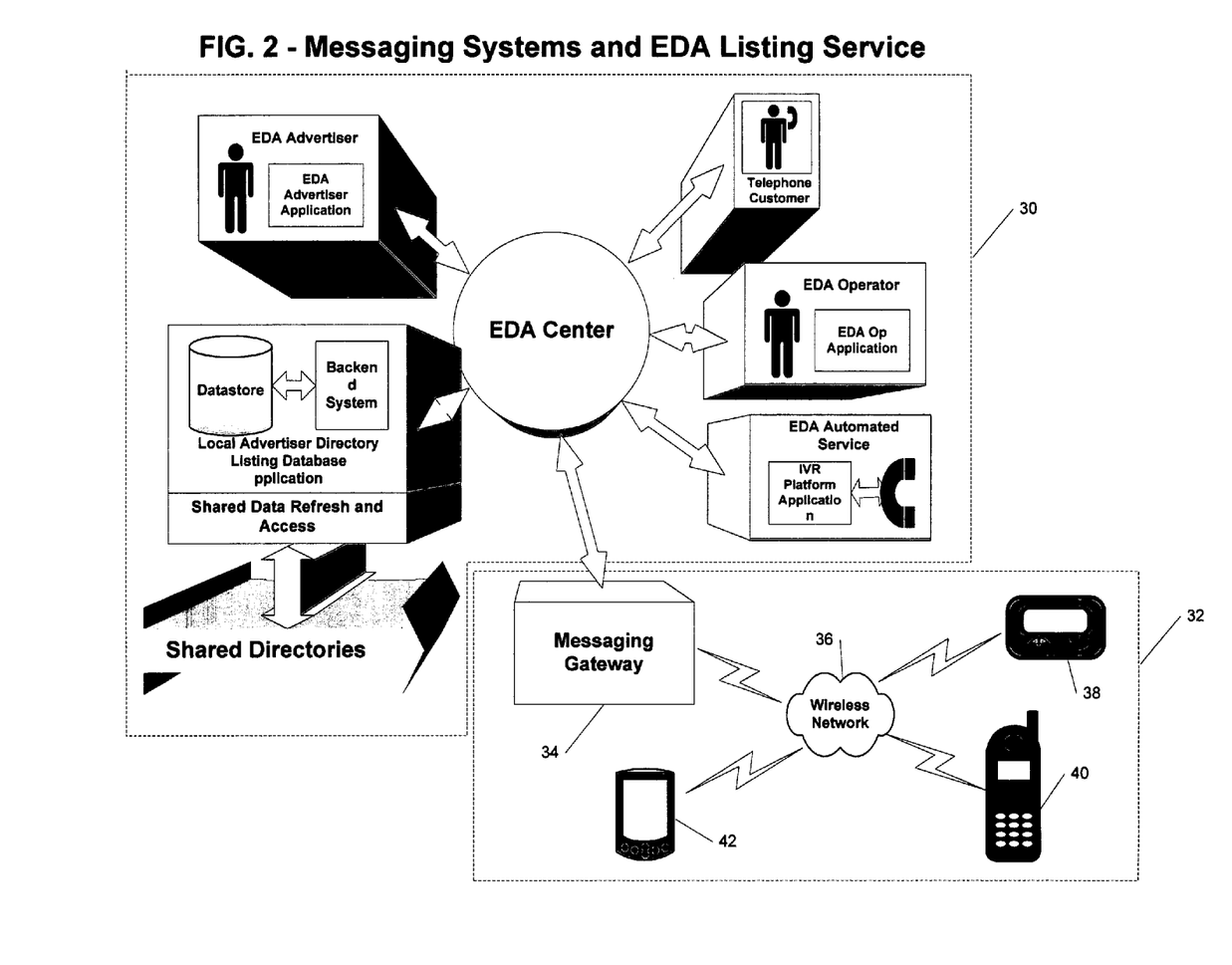
FIG. 2 shows a system block diagram of a Messaging System and an EDA Listing Service.

FIG. 2 shows how a wireless messaging system can be incorporated into the EDA listing service described by FIG. 1. Referring to FIG. 2, the wireless components 32 are connected to a Conventional EDA center 30 via a network such as the Internet.

In one preferred embodiment, the EDA center is connected to a Messaging Gateway (MG) 34 that provides access to multiple wireless messaging systems. The MG is connected to any one of several wireless network 36 standards. The standards currently known in the art are:

GSM Global System for Mobile Communications;
EDGE Enhanced Data for GSM Evolution;
CDMA Code Division Multiple Access;
TDMA Time Division Multiple Access;
GPRS General Packet Radio Service.

Messaging devices such as cell phones 40, wireless PDAs (personal digital assistants) 42 or smart pagers 38 connect to the wireless network to make requests and access the paid EDA referral content. In one preferred embodiment, the messaging devices may initiate a range of EDA requests using operator-assisted EDA, automated IVR voice-enabled systems, pure text messaging systems or a combination of any of the above methods.

Messaging System Infrastructure

Figure 3:
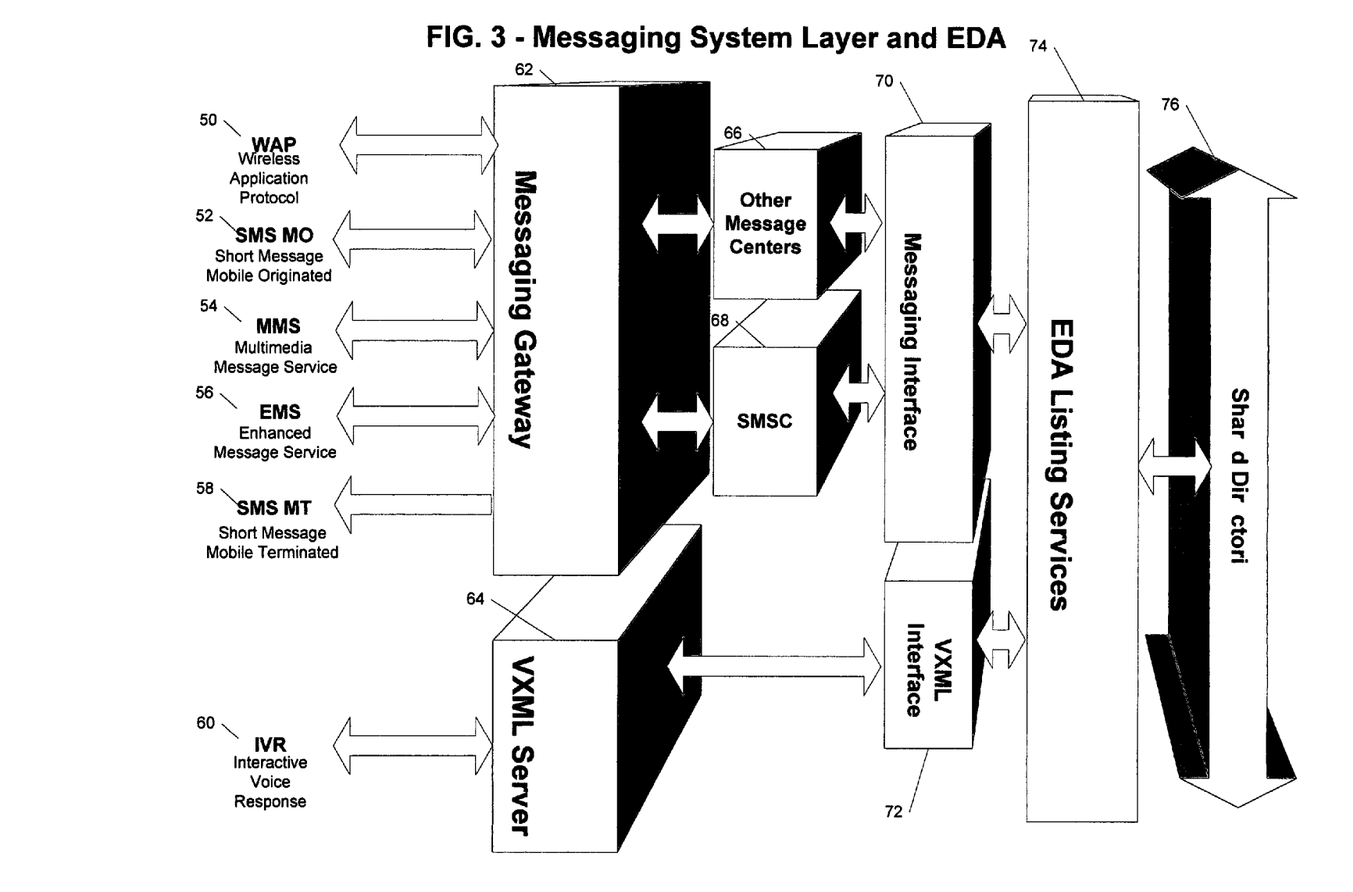
FIG. 3 shows a system block diagram of a Messaging System Layer and its interface to an EDA Listing Service.

FIG. 3 illustrates an embodiment of current message technology and a distributed EDA Listing Service. Referring to FIG. 3, the wireless devices access the extended EDA service through standard wireless protocols:

WAP 50, wireless application protocol;
SMS MO 52, mobile originated short message service;
MMS 54, multimedia message service;
EMS 56, enhanced message service;
SMS MT 58, mobile terminated short message service.

Figure 6:
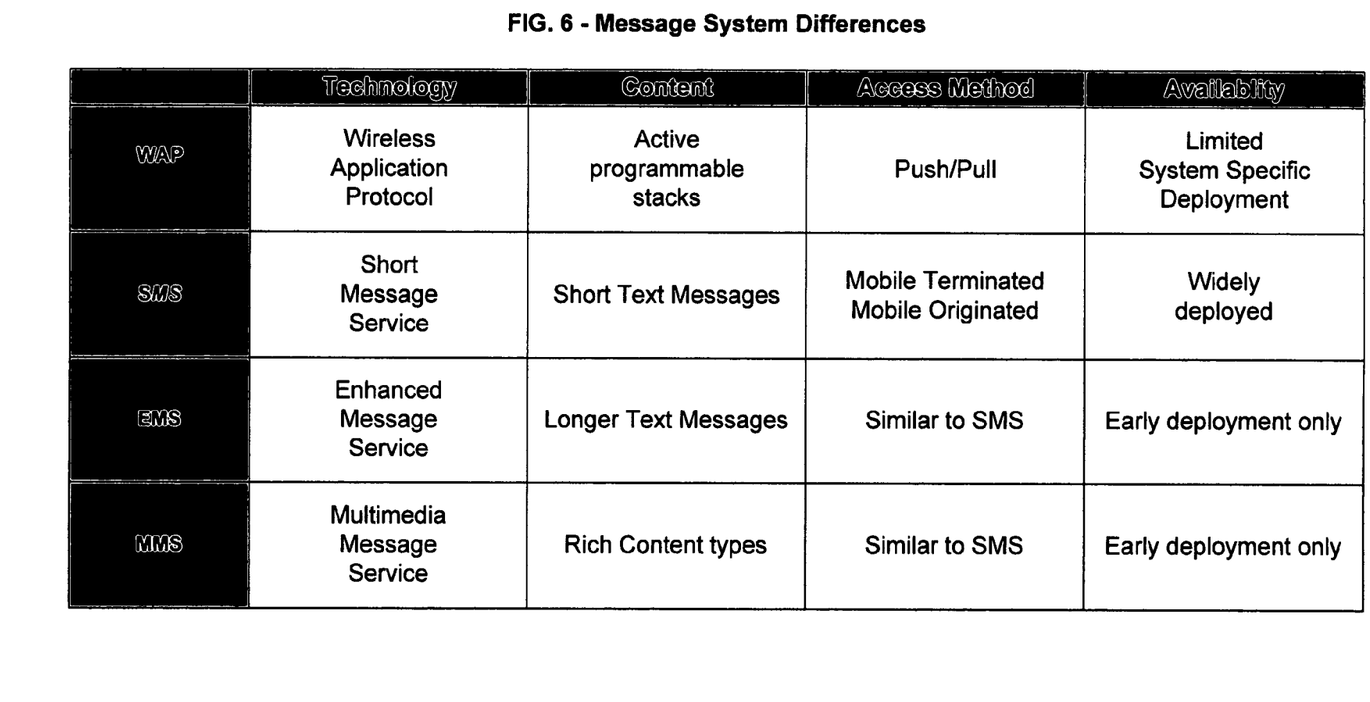
FIG. 6 shows a table listing the differences between messaging protocols as the affect a message-based EDA Listing Service.

The differences between these protocol standards, as regarding the disclosed invention, are summarized in FIG. 6. Note that all the listed wireless protocols are two-way or bi-directional except for SMS MT. Mobile terminated SMS is a broadcast message model, where wireless devices receive messages only. Two-way models allow the wireless device to both send and receive messages.

Referring again to FIG. 3, messages and signals using the various wireless protocols enter the system through the Messaging Gateway (MG) 62. Currently, there are not only incompatible standards used within wireless telecommunications carriers, there are also differing implementations between carriers even within the same standard. The messaging gateway provides protocol transformation functions that map incoming messages to formats compatible with the various supported messaging systems and platforms. In one preferred embodiment, the MG provides transformations between various messaging standards such as SMS to EMAIL to Instant Messaging (IM).

On the same level as the MG is a VXML or Voice XML Server (VXMLS) 64. The VXMLS is a voice-enabled application that provides voice dialogs to make EDA requests and selections. In one preferred embodiment, the VXMLS/messaging standard combination, provides a robust and flexible input system for wireless EDA. The input to the VXMLS is shown as an IVR Interactive Voice Response 60 system.

The MG connects to message centers that rout messages to and from various participants. In SMS, the routing is controlled by an SMSC short message service center 68. In one preferred implementation, the SMSC receives messages, forwards them to the identified recipient if the recipient is available or stores the message for later delivery if the recipient is offline. The SMSC is also able to pre-process messages before delivery and re-route messages programmatically if desired. The MG also connects to other messaging centers, which perform functions analogous to the SMSC for different messaging protocols.

The next functional block—the Messaging Interface 70—transforms messaging formats into compatible EDA requests and responses. This enables the messaging system to connect to a complete EDA Center 74 or node. A similar interface block—the VXML Interface 72—transforms VXML inputs into EDA compatible queries and transforms EDA result lists into formats appropriate for VXML menus. Finally, the EDA Center accesses the EDA network of Shared Directories 74.

The table shown in FIG. 6 details the differences between the various messaging protocols.

WAP—wireless application protocol—while not exclusively a messaging protocol, can nonetheless be used in a wireless EDA implementation. WAP is the de-facto world standard for the presentation and delivery of wireless information and telephony services on mobile phones and other wireless terminals. WAP allows active content in the form of WML (wireless markup language) programmable mini-pages or cards to be generated dynamically and "pushed" or sent directly to cell phone mini-browsers. WAP pages "pull" content from standard web servers and use most of the interactive features commonly associated with web pages and web browsers. While WAP is a standard, it is implemented differently both by equipment manufactures and telecommunications carriers.

SMS—short message service—is the most widely implemented wireless messaging protocol in the world. SMS uses small text-only messages that are typically less than 160 characters in length. SMS operates in two modes Mobile Terminated (MT) and Mobile Originated (MO). MT SMS provides one-way text communication, where cell devices only receive text from the SMS Center. MO SMS allows cell devices to both send and receive messages. MO SMS uses the SMPP—small message peer-to-peer—protocol to send messages directly from one message device to another.

EMS (enhanced message service) and MMS (multimedia message service) typically refer to evolutionary forms of SMS. EMS allows the sending of pictures, sounds and ring tones in longer richer messages. MMS will allow digital sounds, images and even video to be sent when new high capacity network infrastructures are in place. MMS will most likely require full 3G (third generation) wireless networks. Limited EMS is available now, and will become popular when more 2.5G (two and one-half) networks are deployed.

Voice-Enabled Mobile Terminated Messaging

Figure 4:
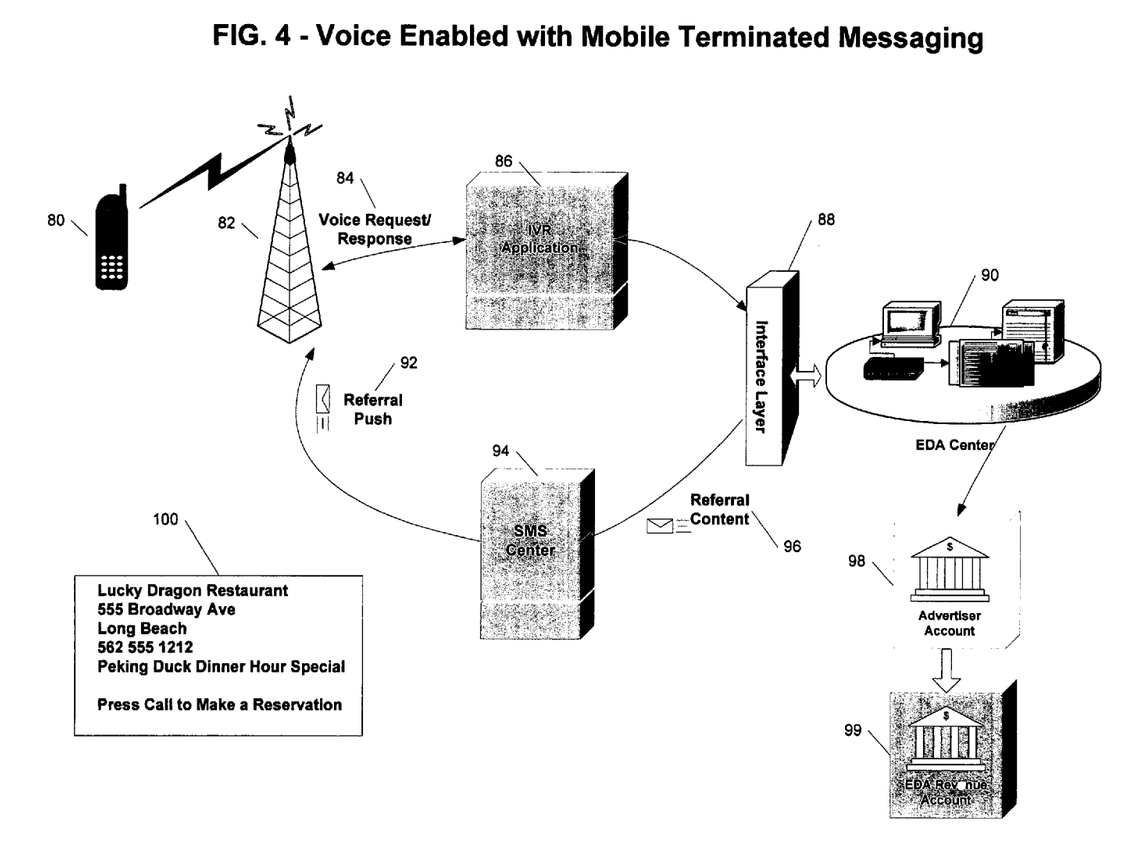
FIG. 4 shows a voice enabled Mobile Terminated Messaging implementation of a message-based EDA Listing Service.

FIG. 4 illustrates an EDA Messaging implementation using MT SMS. The preferred embodiment demonstrates a wireless EDA service using a combination of voice and one-way SMS messaging.

Referring to FIG. 4, a caller on a cell phone 80 dials an EDA access number looking for a local Chinese restaurant. The wireless system 82 connects the caller to an Interactive Voice Response (IVR) application 86 that is connected to an EDA center 88. The interaction between this implementation and the SMS MT EDA system is straightforward.

Through a series of vocal dialogues, the IVR application obtains the keyword "Chinese restaurant" from the caller. The application then submits the keyword to the EDA Center via the Message System Interface Layer 88. The EDA Center returns an ordered referral list representing the paid listings for that keyword. The IVR application creates a vocal selection menu from the referral list and verbalizes the selection options to the caller. At this point, the caller selects one item from the referral menu.

Given a listing selection, the EDA Center proceeds to complete a referral transaction. First, it sends the selected Referral Content 96 to the SMS Center 94 via the Message System Interface Layer 88. A referral business transaction is also initiated to debit a referral amount from an Advertiser Account 98 and add a credit transaction to the EDA Center's revenue account. The actual referral content 96 is routed back 92 through the wireless network to the caller's phone by the SMS Center 94.

In one embodiment, the final referral text message 90 appears on the caller's phone. Using standard SMS techniques, this message can be linked to a call back number that can be the advertiser's referral phone number. Pressing call while viewing this message automatically connects the caller to the referred phone number.

In a preferred embodiment the call back number can be a monitored EDA callback number that is used to track the outcome of the referral. In this arrangement, a central EDA Center number is used as the callback number and each choice is given a different direct dial extension number. Upon connecting to the appropriate number and extension, the EDA customer's call is transferred to the selected advertiser's referral number.

Using a central number callback scheme, the result or outcome of a telephone referral can be monitored and tracked. This type of outcome tracking functionality is further detailed in FIG. 7.

Voice-Enabled Mobile Originated Messaging

Figure 5:
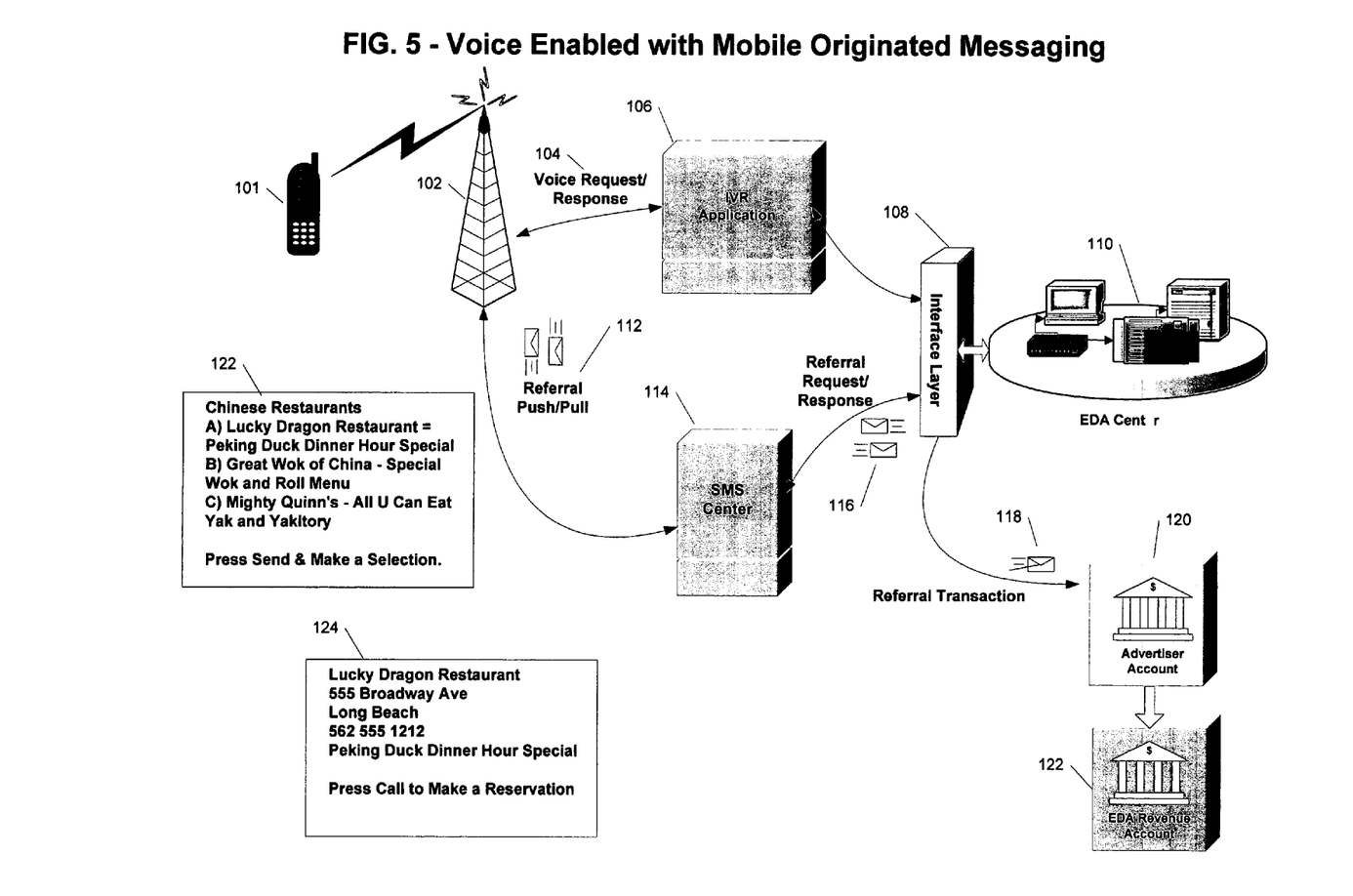
FIG. 5 shows a voice enabled Mobile Originated Messaging implementation of a message-based EDA Listing Service.

FIG. 5 illustrates an EDA Messaging implementation using MO SMS. Referring to FIG. 5, a caller on a cell phone 101 dials an EDA access number looking for a local Chinese restaurant. The wireless system 102 connects the caller to an Interactive Voice Response (IVR) application 106 that is connected to an EDA center 110 via a Messaging System Interface Layer 108. The interaction between this implementation and the SMS MO EDA system is likewise straightforward.

As before, through a series of vocal dialogues, the IVR application obtains the keyword "Chinese restaurant" from the caller. The application then submits the keyword to the EDA Center via the Messaging System Interface Layer 108. The EDA Center returns an ordered referral list representing the paid listings for that keyword.

In one MO SMS embodiment, the referral list is formatted into an SMS application message by the interface layer 108 and sent to the SMS Center 114. The SMS Center then pushes the message to the Wireless Network 102 and back to the caller's cell phone. The referral message 122 appears on the cell phone, waiting for the caller to make a selection.

In one SMS implementation, the caller chooses a selection and presses the "Send" message button, followed by the text message selection identifier "A". The referral response message 112 is sent back to the SMS Center 114 and back to the messaging system interface layer where the returned selection "A" is used by the SMS application logic to return the address, phone number and description of the selected listing. This returned data is converted to a final referral SMS message 124 and sent back through the wireless network to the caller's phone.

At the same time the system returns the referral message, it also initiates a referral transaction, executing a debit transaction on the listing advertiser's account and crediting the EDA Center's revenue account.

Single SMS Message Operational Flow

Figure 7:
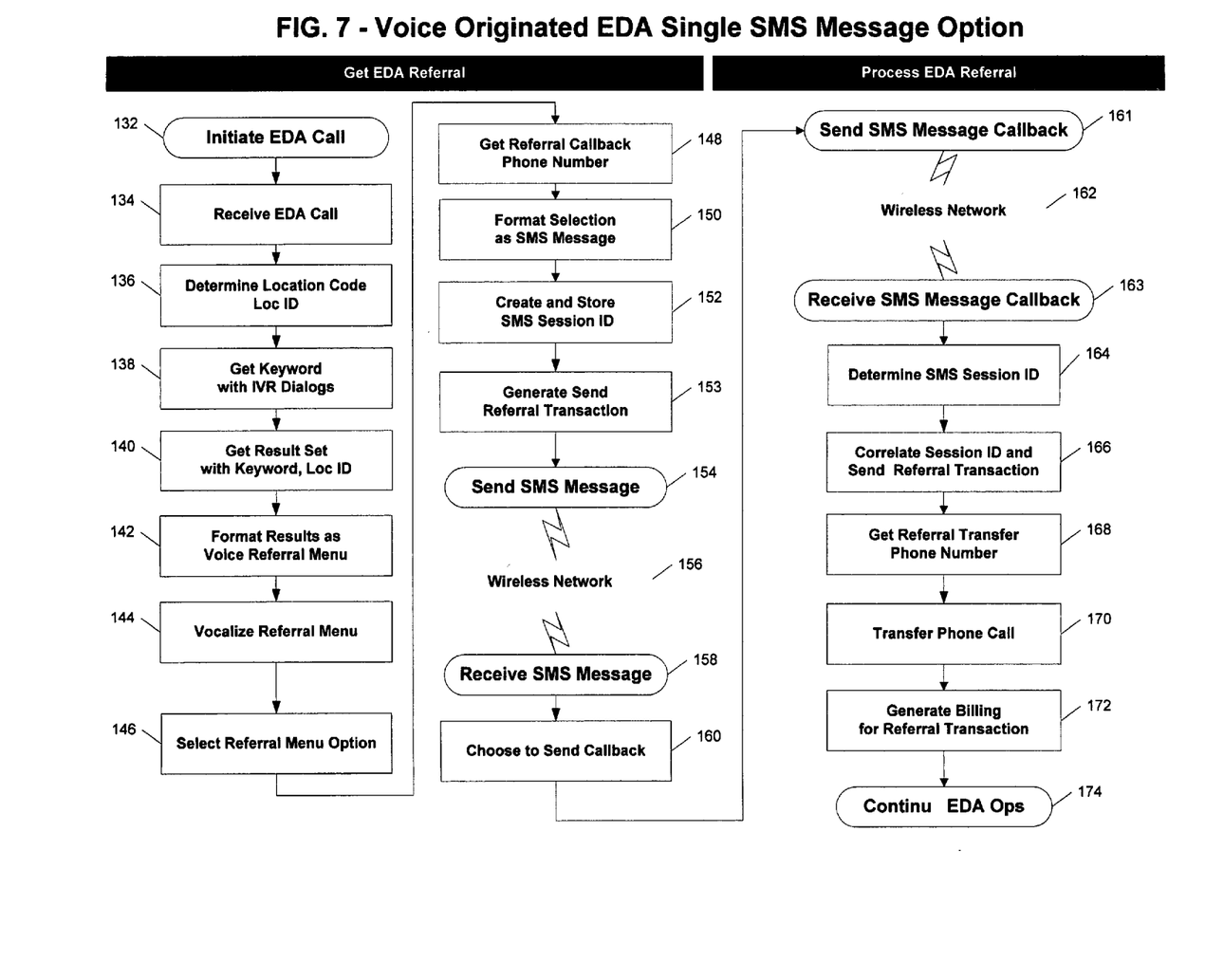
FIG. 7 shows a flowchart of a voice enabled single message implementation of a message-based EDA Listing Service.

FIG. 7 details the operational flow of a single SMS message voice-originated EDA referral. As referenced in the embodiment shown in FIG. 7, the EDA call is initiated 132 by a customer using a cell phone. The call is received at the EDA Center 134 through the wireless network, where the location of the call is determined 136 and stored as a location identifier—Loc ID. In one embodiment this Loc ID is a zip code.

Next in this implementation, the EDA Center wireless network switch connects the call to an Interactive Voice Response (IVR) platform whose task is to determine the sought after EDA keyword. The IVR platform's Get Keyword 138 operation can use any of the well-known speech recognition technologies available in the current art.

In one embodiment a Voice XML (VXML) platform creates a series of voice dialogs which direct the user to the most applicable keywords in the system. Well-designed voice dialogs can increase the degree of recognition certainty, thus making the IVR application more robust and the advertising system more efficient.

Once the keyword is determined, the EDA listing database is queried with the keyword and location parameters. As explained in the basic EDA Listing Service operation, the EDA database returns an appropriate set of directory referral listings 140. The messaging interface layer then formats the result set as a VXML voice menu 142 and prompts the user to choose an option by vocalizing the menu 144. In the single SMS message embodiment disclosed, all EDA query determination and result set information exchange occurs in voice and text-to-speech interactions.

According to the teachings of the invention, other configurations of the EDA functions can be developed. In one embodiment, more detailed description of the various options can be conveyed by playing back pre-recorded voice tracks, making the system appear more human and more approachable.

Once the interaction between the caller and the EDA system is complete, a menu option will be selected. The selected option will then be mapped to a referral phone number, travel directions and assorted business information. This data is returned to the EDA message center where it is formatted as a message 150.

Next, in a preferred embodiment, the EDA Messaging Interface layer creates an SMS Session ID that relates the current EDA query to a particular cell number. In other words using this SMS Session ID, an EDA server can retrieve all of the current EDA query details. The operation of the SMS Session ID is further detailed in FIG. 9.

At this point in the implementation a Send Referral Transaction record 152 is generated and stored with the SMS Session ID. Also, the SMS message is sent out to the EDA caller 154 via the wireless phone network 156.

Continuing along with the preferred implementation of FIG. 7, the customer receives the SMS message 158. If the customer so chooses after reading the message, the customer may automatically dial the displayed SMS callback number 160 by pressing the "Call" or "Send" phone button. The callback is sent 161 back to the EDA Center as an SMS Callback via the wireless network 162.

Next the EDA center's messaging interface receives 163 and begins to process the callback. The processing begins by determining the SMS Session ID 164 from the EDA customer's cell number. It then correlates the Session ID with the Send Referral Transaction 166. From there the server retrieves the Referral Transfer Phone number 168. Finally, before ending the EDA session, the EDA Center server transfers the call to the paid Referral Phone Number 170 and generates a Billing Referral Transaction 172 record. At this point the normal EDA Center business operations take over 174.

SMS Message Menu Operational Flow

Figure 8:
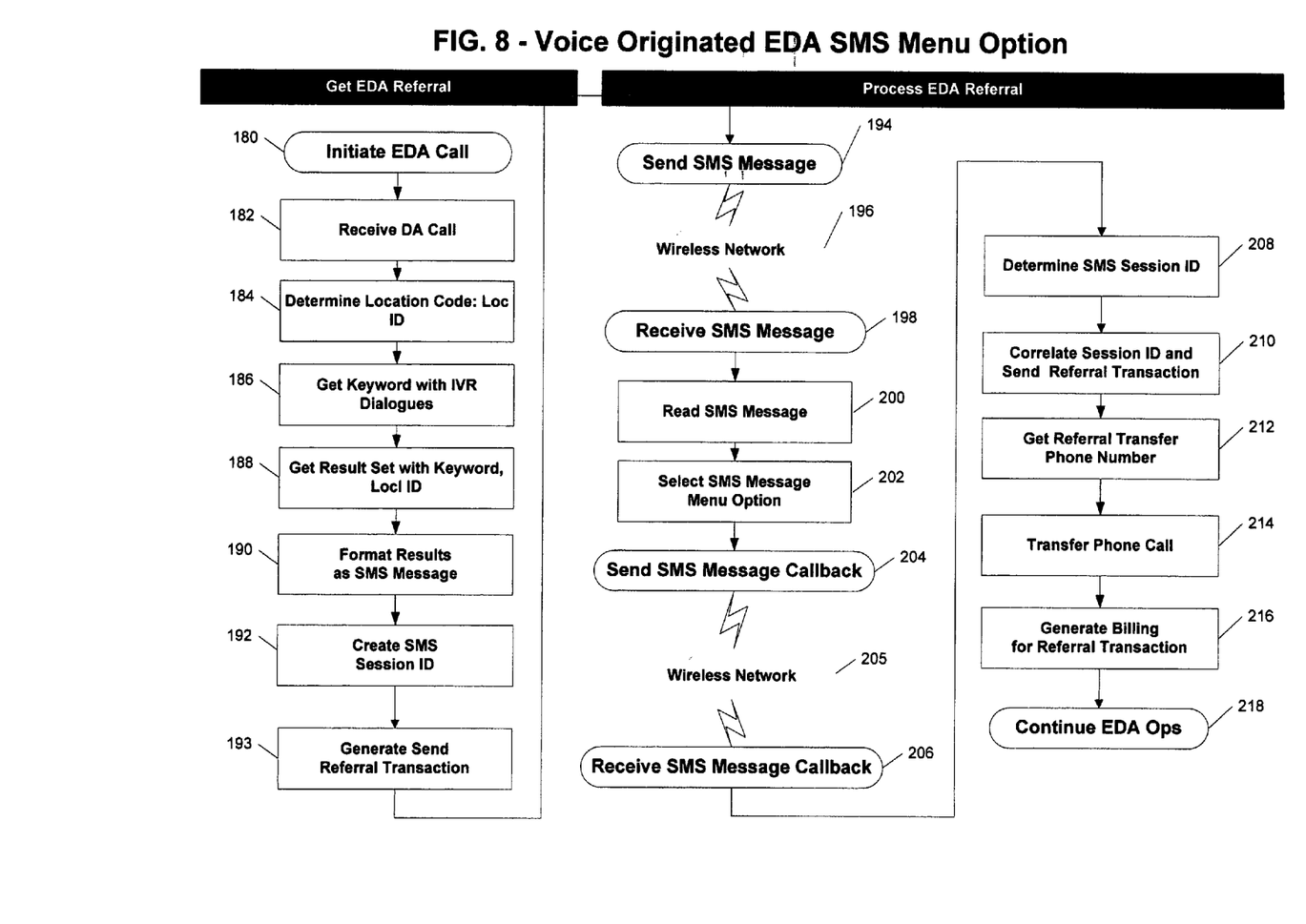
FIG. 8 shows a flowchart of a voice enabled message menu implementation of a message-based EDA Listing Service.

FIG. 8 shows an embodiment of an SMS Menu based EDA implementation. As referenced by FIG. 8, the customer initiates an EDA call 180 using a cell phone. The call is received at the EDA Center 182 through the wireless network, where the location of the call is determined 184 and stored as a location identifier—Loc ID. In one embodiment this Loc ID is a zip code.

Next in this implementation, the EDA Center wireless network switch connects the call to an Interactive Voice Response (IVR) platform whose task is to determine the sought after EDA keyword. The IVR platform's Get Keyword 186 operation can use any of the well-known speech recognition technologies available in the current art.

In one embodiment a Voice XML (VXML) platform creates a series of voice dialogs which direct the user to the most applicable keywords in the system. Well-designed voice dialogs can increase the degree of recognition certainty, thus making the IVR application more robust and the advertising system more efficient.

Once the keyword is determined, the EDA listing database is queried with the keyword and location parameters. As explained in the basic EDA Listing Service operation, the EDA database returns an appropriate set of directory referral listings 188. Here the SMS menu implementation begins to diverge from the previous single message implementation.

First the Messaging Interface layer formats the result set as a longer message with multiple callback numbers. Each menu option will be mapped to a referral phone number, travel directions and assorted business information. This data is returned to the EDA message center where it is formatted as a message 190.

Once the SMS menu message has been constructed, the messaging interface layer creates an SMS Session ID 192 that is used to relate the current EDA query to this customer call. The operation of the SMS Session ID is further explored in FIG. 9. After generating a Send Referral Transaction record 193, the messaging layer submits the SMS message to the wireless network for delivery 194. The SMS menu message is then carried over the Wireless Network 196 and delivered to the calling customer.

In the SMS message menu embodiment disclosed, all EDA query determination and result set information exchange occurs via two-way SMS messaging. In one embodiment, more detailed description of the various options can be conveyed by sending back individual description messages on demand, making the system much more informative and accessible. According to the teachings of the invention, other configurations of the SMS EDA service can be developed. The functional blocks used in the core SMS EDA service are detailed in FIG. 10.

Continuing along with the preferred implementation of FIG. 8, the customer receives the SMS message 198. After reading the referral menu message 200, the customer selects an option 202 and sends the displayed SMS callback number by pressing the "Call" or "Send" phone button. The callback is sent 204 back to the EDA Center as an SMS Callback via the wireless network 205.

Next the EDA center's messaging interface receives the callback message 206 and begins to process the message. The processing begins by determining the SMS Session ID 208 from the EDA customer's cell number. It then correlates the Session ID with the Send Referral Transaction 210. From there the server retrieves the Referral Transfer Phone number 212. Finally, before ending the EDA session, the EDA Center server transfers the call to the paid Referral Transfer Phone Number 214 and generates a Billing Referral Transaction 216 record. At this point the normal EDA Center business operations take over 218.

Session ID's and Transaction Correlation

Figure 9:
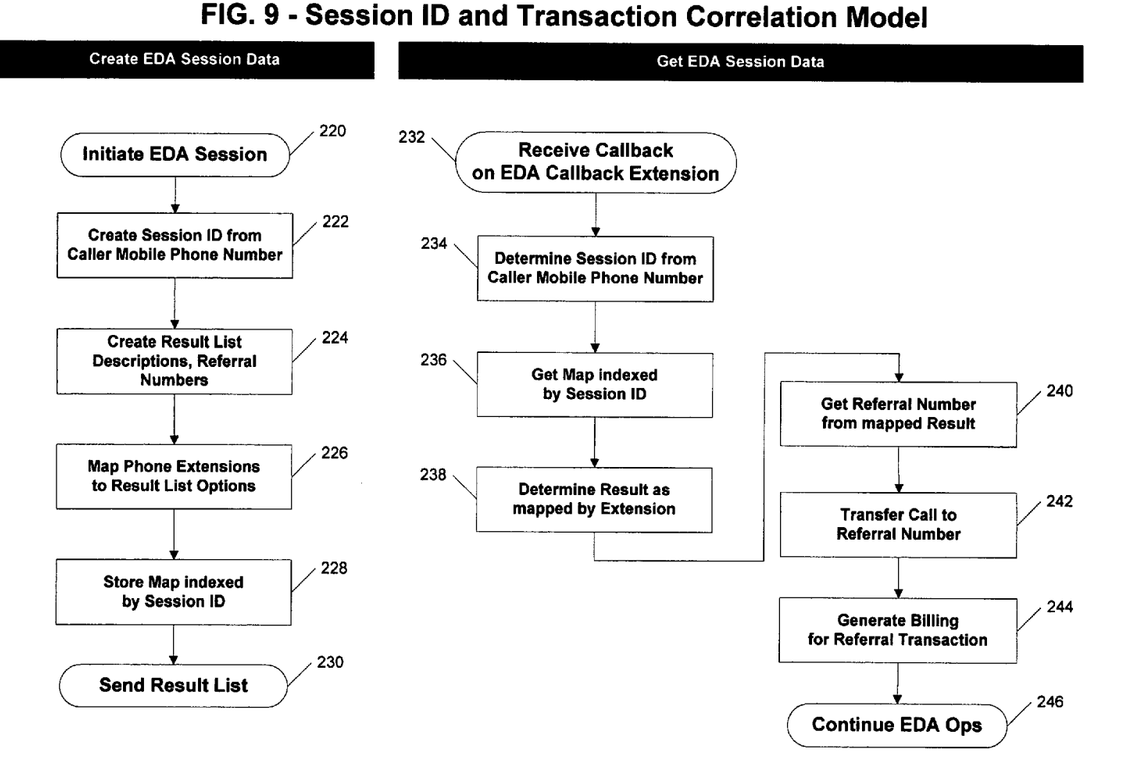
FIG. 9 shows a flowchart of an SMS Session ID and how it relates to the EDA Transaction Correlation model.

FIG. 9 details the workings of the Session ID and its relationship to EDA Transactions. The interaction between the central EDA listing service and a cell phone customer can rightly be characterized as a classic client/server system where the cell phone is the client application and the various EDA Center services make up the server.

The requests and responses between the components are asynchronous and disconnected in nature. This means that there is no intrinsic property that relates a specific EDA request to a specific EDA result set. For this reason, the disclosure introduces the notion a Session ID.

As shown in the preferred embodiment detailed in FIG. 9, before an EDA query is executed by the Local Advertiser Directory Listing Database Application, an EDA Session is initiated 220. At the Messaging Interface layer that interfaces with the standard EDA Listing Service, a program will create a session ID 222 that is related to the EDA customer's mobile phone number. In one embodiment this ID could be the actual ten digit phone number such as "5625551212". Or it could be a hash code generated from this number.

In the course of the EDA call, an EDA result list will be generated 224. This ordered list represents the directory listings, descriptions and referral phone numbers for specific keyword and location code EDA query parameters. The result list will then be mapped to a set of phone numbers that identify each listing 226.

In one embodiment this set of numbers could represent direct-dial phone extensions within the EDA Center call-switching center. These phone numbers are the actual callback numbers used in an SMS message callback. In this mapping configuration, each callback number would be related to the referral phone numbers on the EDA result list. This phone mapping would then be stored with the Session ID for later callback processing 228.

The EDA result list will then be formatted as a Message, with the mapped phone numbers as callback numbers. This message can then be sent via the wireless network 230.

After the customer's cell phone has received the message block, the customer can automatically dial the callback number. Pressing the "call" button while displaying a phone number from the EDA result list message usually does this.

Later the EDA Center receives the callback on an EDA callback extension 232 and begins to process it. First an EDA Messaging server determines the Session ID form the customer's cell phone number 234. To keep the requests in sync, the Session ID is generated using the same technique as in 222.

Next the server gets the previously stored phone extension map using the session ID 236. From this phone map, the EDA Messaging server reconstructs the result list options and gets the referral phone number 240 representing the selected EDA referral option. The call is the transferred to this number 242 and a Referral Transaction is generated for billing the referral 244.

Core Messaging EDA Functional Blocks

According to the teachings of this invention, adding a messaging system to a paid EDA referral advertising system is straightforward. As we have seen in this disclosure, there are many messaging standards as well as many implementations of these standards by various wireless carriers.

Figure 10:
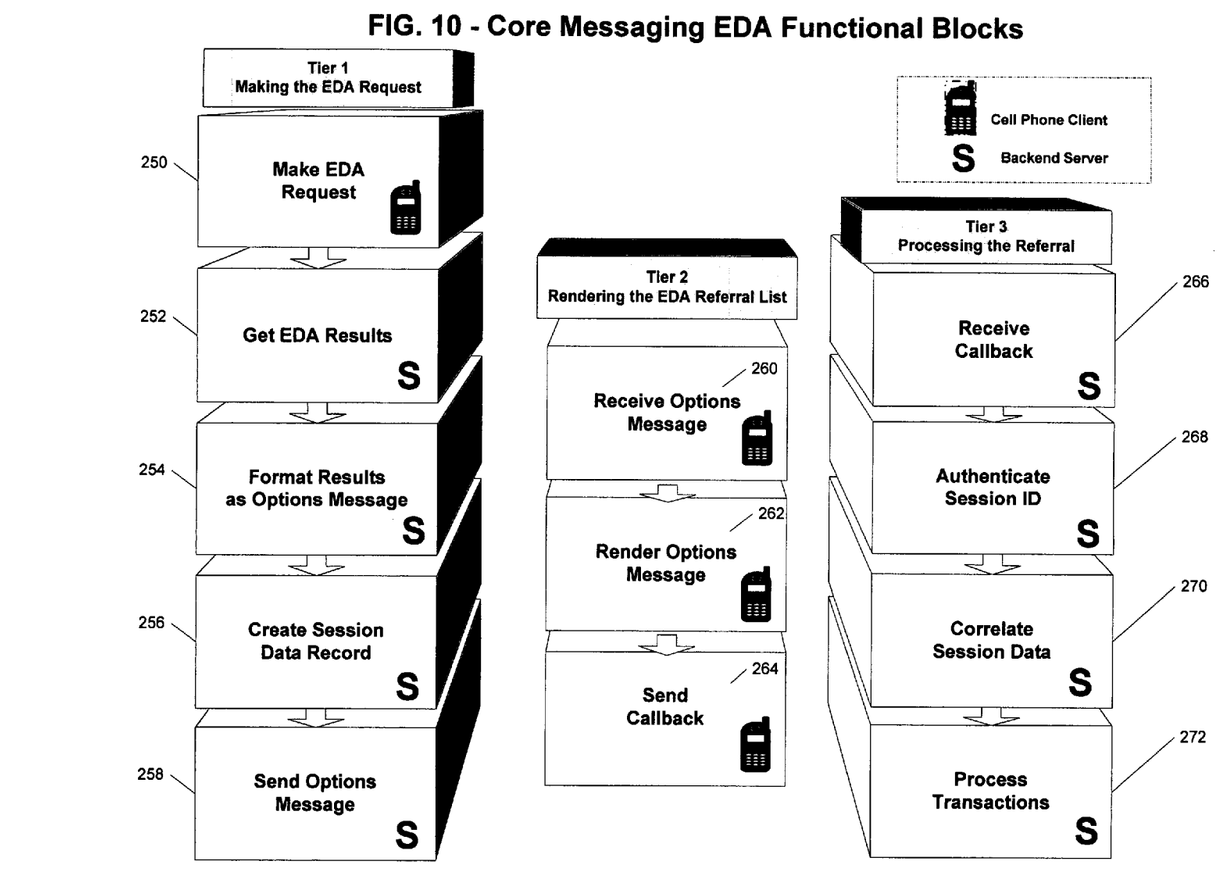
FIG. 10 shows the core functional blocks of a generic messaging EDA implementation.

FIG. 10 shows the core messaging EDA functional blocks as three tiers—1, 2 and 3. Referring to FIG. 10, the three tiers roughly represent different three phases of a messaging EDA implementation: Making the EDA Request, Rendering the EDA Referral List; and Processing the Referral Message. The messaging EDA system that is the subject of this disclosure may implement alternative technologies within any of these blocks. Likewise, the order and configuration of these blocks may vary while still following the teachings of this invention.

Making the EDA Request

Tier 1 begins with Make EDA Request 250. This function usually involves a customer using a cell phone to call the EDA Center. It also involves getting the parameters of the EDA query: a keyword and a location. The query parameters may be determined in several ways: by answering a series of VXML dialogs; by creating a formatted text message; or by making an operator-assisted database query.

In an alternative embodiment the Make EDA Request function could be accomplished by using dedicated software/hardware key combinations. In one embodiment a series of button presses such as "#"—"*"—"R" could represent and EDA Request for "Nearest Restaurants". Another embodiment might employ sending an SMS message to the EDA Center with a keyword as the message payload.

The Get EDA Results block 252 represents the Messaging Gateway and any message interfacing functionality. One embodiment might include messaging system translation layers that allow messages sent by one messaging standard to be received via another standard. The Format Results as Options Message 254 block represents systems that convert the EDA database formats into various messaging formats such as SMS, EMS, MMS and even WAP.

The Create Session Data block 256 represents any data persistence technology that allows loosely coupled asynchronous systems to conduct robust and reliable transactions. This function might involve databases, message queues, and transaction coordinators that are well known in the current art.

The final block in tier 1 is the Send Options Message 258 block. The Send Message block broadcasts the message to a mobile receiver. This server-based function might be accomplished by a wireless message control center such as an SMSC in an SMS messaging implementation. In another embodiment, this function might involve an Instant Messaging (IM) to wireless translation service linking TCPIP-based IM systems to wireless text message networks.

Rendering the EDA Referral List

Tier 2 involves functions that receive and display or render EDA Messages. This function could be accomplished by a cell phone that Receives the Options Message 260 displays the message 262 and allows the EDA customer to respond to the message with an automatic Callback 264.

In an alternative embodiment the Render Options Message function might involve a dynamically generated WAP page with HTML encoded links that automatically dial the callback number. Another embodiment might involve multimedia images that represent the various options with linked callback numbers as HTML anchors.

Processing the Referral Message

Tier 3 represents the business infrastructure of a message-based EDA paid referral system. In reference to FIG. 10, to begin the referral processing cycle, a message center server Receives the Callback 266. Next the message server Authenticates the Session ID, which basically means the referral service identifies who is making the callback. This authentication involves determining the phone number of the wireless device making the callback and using the number to generate a Session ID.

The Session ID is used to access the session data record constructed in 256 perform the Correlate Session Data function 270. As previously described, the Session ID provides a method to relate two separate message requests to the same EDA referral. Because they share the same Session ID, the loosely coupled requests can participate in a single complete transaction. This session ID makes it possible for any number of discrete transactions to be initiated 272 to complete the EDA Referral process.

It is claimed:

1. A method of sharing directory listings via a wireless messaging system in a distributed environment using a computer network comprising:
   (a) Maintaining a database including a plurality of directory listings, wherein each listing is associated with a referral phone number, at least one search term and a dynamic, controllable index;
   (b) Receiving a directory assistance request in the form of a keyword from the customer;
   (c) Identifying the directory listings having keyword terms generating a match with the request;
   (d) Ordering the identified directory listings into a phone number result list in accordance with the values of some controllable index for the identified directory listings;
   (e) Translating phone number result list into a format that is compatible with a wireless messaging standard;
   (f) Transmitting the translated result list through a wireless messaging system back to the requesting customer's wireless messaging device;
   (g) Enabling the receiving message device to automatically callback the directory listing provider requesting a telephone referral;
   (i) Receiving the message phone callback and authenticating the caller;
   (j) Correlating the callback to a previous request and result set;
   (k) Transferring the callback phone call to the corresponding telephone referral number;
   (l) Initiating a business transaction to generate billing and revenue transactions for the paid referral.

* * * * *